Inventor:
Alfred Pollanz

United States Patent Office 3,442,417
Patented May 6, 1969

3,442,417
LINED STRUCTURE AND METHOD OF MAKING SAME
Alfred Pollanz, Essen, Germany, assignor to Beteiligungs- und Patentverwaltungsgesellschaft mit beschrankter Haftung, Essen, Germany
Filed Mar. 9, 1966, Ser. No. 533,062
Claims priority, application Germany, Mar. 16, 1965, B 80,988
Int. Cl. B65d 25/14, 25/34; B21d 39/00
U.S. Cl. 220—63                 6 Claims

ABSTRACT OF THE DISCLOSURE

A lining connection between a container having an inner wall surface and an outer wall surface, on one hand, and a lining on the inner wall surface of said container, on the other hand, said lining being connected to said container by friction only of an insert with said container, said insert passing through passages in said container and having one end portion only welded to the lining.

---

The present invention relates to a lined structure and a method of making same and is in particular directed to the connection of a lining in a container, especially a titanium lining in a reaction vessel of steel.

It is known to connect a lining to a container by riveting or by welding. However, these connecting methods frequently encounter difficulties inasmuch as certain lining materials cannot be welded to certain container materials, whereas riveting the lining to the inner wall of the container requires bores in the lining. Such bores, however, especially when the intended pressure in the interior of the container will differ from the pressure outside the container, bring about the danger that the lining will become leaky after a relatively short time of use.

It is, therefore, an object of the present invention to overcome the above mentioned drawbacks.

It is another object of this invention to provide a lined structure and method of making same, which, even when the lining is of a material that cannot be welded to the container material, will not require bores and will result in a tight connection of the lining to the container.

These and other objects and advantages of the invention will appear more clearly from the following specification in connection with the accompanying drawings, in which.

The present invention is characterized primarily in that the container to which the lining is to be connected, is provided with passage means extending from one side of the container to the other side thereof to which the lining, preferably of titanium, is to be connected while connecting means, e.g. in the form of a tubular member, a hollow conical member or the like, is arranged in said passage means in engagement with the wall confining said passage means, said connecting means and said lining being of a material adapted to be welded together and being welded together. The dimensions, number and location of said connecting means may be selected in conformity with the stress to which the lined structure is to be subjected. Both the lining and said connecting means may consist of the same material, e.g. titanium, or of different materials, the only requirement being that they can be welded together.

Advantageously, tubular members having a length approximately equalling the thickness of the container wall are employed as connecting elements for connecting the lining to the container. These tubular members are inserted into corresponding bores or passages extending through the container and preferably have that end thereof which is adjacent the lining flanged inwardly and welded to the lining whereas the other end of said tubular members which protrudes beyond the respective bore or passage is flanged outwardly into close contact with the respective adjacent container surface.

This method merely requires the provision of cylindrical bores in the container wall which can easily be produced. Also the said tubular members can easily be produced economically.

Figure 1:
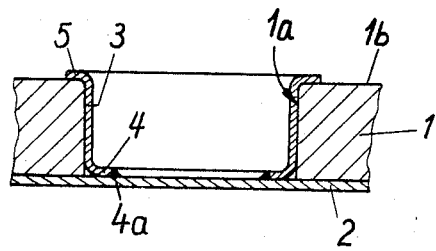
FIG. 1 illustrates the present invention in connection with a tubular member serving as element for connecting the lining to the container.

Referring now to the drawing in detail and FIG. 1 thereof in particular, this figure shows a portion of a steel container the interior surface of which is covered by a lining 2 of titanium sheet metal. Lining 2 is connected to container wall 1 by tubular connecting elements 3 (one only being shown) of titanium. Each of said tubular connecting elements 3 is inserted into a passage in container wall 1a in container wall 1 and has that end 4 flanged inwardly which is adjacent to said lining 2. The inner edge of flanged portion 4 is welded to lining 2 at 4a. The other end 5 of each connecting element 3 is flanged outwardly into close supporting contact with the adjacent container wall surface 1b.

According to a further development of the present invention and in order to save the flanging of the ends of the connecting elements, connecting elements are employed in the form of hollow conical members which are inserted into correspondingly shaped bores or passages in the container wall and which have those ends thereof that are adjacent to the lining welded thereto. The engagement of the conical surface of the hollow conical members with the correspondingly shaped wall surfaces of said passages or bores will assure a proper connection of the lining in its desired position.

Figure 2:
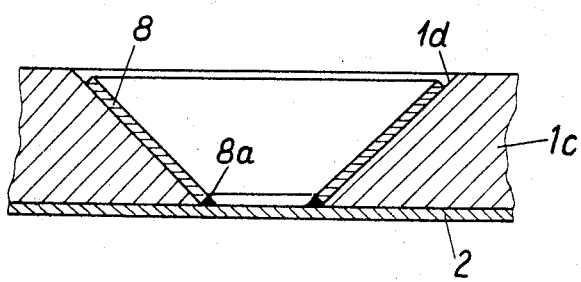
FIG. 2 represents a modification of the invention differing from FIG. 1 in that a hollow conical member serves as element for connecting the lining to the container.

This embodiment of the invention is clearly illustrated in FIG 2 in which a portion of the container 1c is provided with a plurality of conical bores or passages 1d (one only being shown). A connecting element in the form of a hollow cone-shaped member 8 with the outer surface thereof corresponding to the shape of bore 1d is inserted into the latter and has that end which is adjacent to the lining 2 welded thereto as indicated at 8a. Also in this instance the member 8 and the lining 2 may consist of titanium, but may also consist of other materials which can be welded together.

Figure 3:
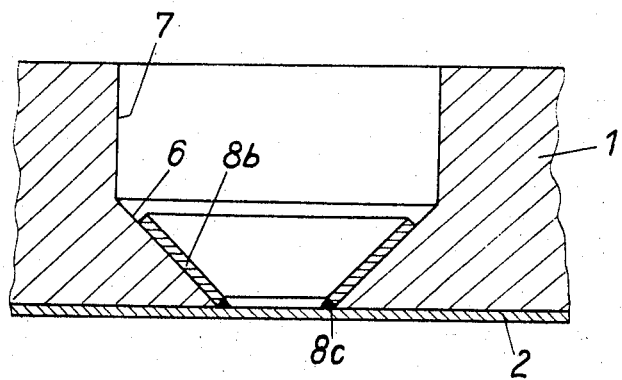
FIG. 3 is a further modification of the invention employing a hollow conical member in a partly cylindrical and partly conical bore in the container for establishing connection between the latter and the lining therefor.

Finally, FIG. 3 shows a further embodiment of the invention which is similar to that of FIG. 2 but differs therefrom in that the conical bore 1d of the FIG. 2 embodiment has been replaced by a bore with a conical section 6 and a cylindrical section 7, the conical connecting member 8b being arranged in the conical bore section 6, and being welded to lining 2 at 8c. Wtih the arrangement of FIG. 3, the outside diameter of the bore is less than is the case with the FIG. 2 embodiment of the invention.

It is, of course, to be understood that the present invention is, by no means, limited to the specific embodiments shown in the drawing but also comprises any modifications within the scope of the appended claims.

What I claim is:

1. In combination with a container having an outer wall surface and an inner wall surface and being provided with a plurality of spaced passage means extending from one of said wall surfaces to the other one of said wall surfaces and formed by a cylindrical bore, a lining in engagement with one of said wall surfaces, and connecting means arranged in said passage means and formed by tubular means having one end inwardly flanged and welded to said lining and having the other end outwardly flanged and in frictional engagement only with and resting on the other one of said wall surfaces, said tubular connecting means being thin-walled and at maximum equalling the thickness of said lining.

2. In combination with a container having an outer wall surface and an inner wall surface and being provided with a plurality of spaced passage means extending from one end of said wall surfaces to the other one of said wall surfaces and formed by conical bores, a lining in engagement with one of said wall surfaces, said conical bores tapering toward said lining, and thin-walled connecting means arranged in said passages and formed by hollow truncated cone-shaped members having the outer surfaces thereof shaped in conformity with and also in engagement with the container wall portions defining said conical bores, said truncated cone-shaped members having their smaller diameter ends welded to said lining, said hollow truncated cone-shaped connecting means having a thickness at maximum equalling the thickness of said lining.

3. In combination with a container having an outer wall surface and an inner wall surface and being provided with a plurality of spaced passage means having a cylindrical section leading from one wall surface of said container to a plane spaced from said other wall surface of said container, a lining engaging said other wall surface and extending across said passage means, each of said passage means also comprising a conical section tapering from said plane toward and arranged adjacent to said lining, and connecting means arranged in said passage means and being formed by hollow truncated cone-shaped members having the outer surface thereof shaped in conformity with and in engagement with those container wall sections of said passage means which define said conical sections, said truncated cone-shaped members having their smaller diameter ends welded to said lining and having a wall thickness approximately equalling the wall thickness of said lining.

4. A method of connecting a lining to a wall surface of a container, which includes the steps of: providing said container with passage means therethrough extending from the container wall surface to be lined to the opposite container wall surface, applying the lining to be connected to the container to the container wall surface to which it is to be fastened, selecting connecting means of a material adapted to be welded to the material of said lining while having a thickness at maximum equalling that of said lining, and inserting said connecting means into said passage means and welding the adjacent end portion thereof to said lining while maintaining frictional engagement only between the remaining portion of said connecting means and said container.

5. A method according to claim 4, which includes the steps of providing said container wall with cylindrical passage means therethrough and forming the connecting means as tubular members with that end portion thereof which is adjacent said lining flanged inwardly and welded to said lining and with the other end of said tubular members flanged outwardly and folded over that container wall surface which is remote from said lining.

6. A method according to claim 4, which includes the steps of making said passage means conical while tapering toward said lining, and shaping said connecting means in the form of frustro-conical hollow members while welding the smaller diameter end of said members to said lining.

References Cited
UNITED STATES PATENTS

| | | | |
|---|---|---|---|
| 2,084,298 | 6/1937 | Secrist | 220—63 XR |
| 2,117,500 | 5/1938 | Rambush et al. | 29—455 |

FOREIGN PATENTS

| | | |
|---|---|---|
| 1,053,258 | 8/1963 | Great Britain. |

GEORGE T. HALL, *Primary Examiner.*

U.S. Cl. X.R.

29—455